(12) United States Patent
Wang

(10) Patent No.: US 6,439,308 B1
(45) Date of Patent: Aug. 27, 2002

(54) FOAM DRIVE METHOD

(75) Inventor: Demin Wang, Daqing (CN)

(73) Assignee: Da Qing Petroleum Administration Bureau, Daqing (CN)

( * ) Notice: Subject to any disclaimer, the term of this patent is extended or adjusted under 35 U.S.C. 154(b) by 0 days.

(21) Appl. No.: 09/647,854

(22) PCT Filed: Apr. 6, 1998

(86) PCT No.: PCT/CN98/00057

§ 371 (c)(1),
(2), (4) Date: Dec. 5, 2000

(87) PCT Pub. No.: WO99/51854

PCT Pub. Date: Oct. 14, 1999

(51) Int. Cl.$^7$ .............................................. E21B 43/22
(52) U.S. Cl. .................... 166/270; 166/270.1; 166/275; 166/309; 166/401; 166/402; 166/403; 507/202
(58) Field of Search ............................. 166/270, 270.1, 166/275, 305.1, 309, 400, 401, 402, 403; 507/202, 935, 936

(56) References Cited

U.S. PATENT DOCUMENTS

| | | | | |
|---|---|---|---|---|
| 3,330,346 A | * | 7/1967 | Jacobs et al. | 166/401 |
| 4,044,833 A | | 8/1977 | Volz | 166/307 |
| 4,495,995 A | * | 1/1985 | Chen et al. | 166/309 X |
| 4,513,821 A | * | 4/1985 | Shu | 166/402 |
| 4,606,407 A | | 8/1986 | Shu | |
| 4,676,316 A | * | 6/1987 | Mitchell | 166/403 |
| 4,813,483 A | * | 3/1989 | Ziegler | 166/400 |
| 4,863,618 A | * | 9/1989 | Falls | 166/270.1 |
| 4,911,241 A | | 3/1990 | Williamson et al. | 166/308 |
| 5,074,358 A | | 12/1991 | Rendall et al. | |
| 5,129,457 A | | 7/1992 | Sydansk | |
| 5,199,490 A | * | 4/1993 | Surles et al. | 166/270 |
| 5,307,878 A | | 5/1994 | Sydansk | 166/305.1 |
| 5,363,914 A | * | 11/1994 | Teletzke | 166/402 |
| 5,363,915 A | | 11/1994 | Marquis et al. | |
| 5,614,473 A | * | 3/1997 | Dino et al. | 507/202 |
| 5,638,902 A | * | 6/1997 | Martin | 166/270 |
| 5,834,406 A | * | 11/1998 | Sydansk | 166/309 X |
| 6,022,834 A | * | 2/2000 | Hsu et al. | 166/275 X |
| 6,268,314 B1 | * | 7/2001 | Hughes et al. | 507/202 |

FOREIGN PATENT DOCUMENTS

| | | |
|---|---|---|
| SU | 1760095 A1 | 9/1992 |
| WO | WO 92/15769 | 9/1992 |

OTHER PUBLICATIONS

Alkaline–Surfactant–Polymer Flood of the West Kiehl, Minnelusa Unit, JJ Meyers, MJ Pitts and Kon Wyatt, SPE/DOE 24144, Society of Petroleum Engineers, Inc., 1992, pp. 423–435.

Viscosity Behavior of Alkaline, Surfactant, Polyacrylamide Solutions Used for Enhanced Oil Recovery, HA Nasr-El-Din, BF Hawkins, KA Green, SPE 21028, Society of Petroleum Engineers, Inc., 1991, pp. 293–306.

Design and Application of an Alkaline–Surfactant Polymer Recovery System to the West Kiehl Fild, SR Clark, MJ Pitts, SM Smith, Society of Petroleum Engineers, 1988, SPE 17538, pp. 515–522.

* cited by examiner

*Primary Examiner*—George Suchfield
(74) *Attorney, Agent, or Firm*—Heslin Rothenberg Farley & Mesiti P.C.

(57) ABSTRACT

A foam drive method for enhancing oil recovery efficiently is initiated by injecting into a subterranean oil-bearing formation, an aqueous polymer solution as a preceding-slug. This is followed by periodically injecting simultaneously or alternately a non-condensible gas and an aqueous solution of foaming composition to form a combined foam under ground or periodically injecting the combined foam formed beforehand by the gas and said aqueous solution above ground. The aqueous solution of foaming composition comprises an alkali, a surfactant and a polymer. Thereafter, an aqueous polymer solution used as a protecting-slug is injected into the formation; followed by continuing waterflooding.

16 Claims, No Drawings

FOAM DRIVE METHOD

The present invention relates to a method for enhancing oil recovery efficiency, and more particularly, to a foam drive method.

BACKGROUND OF THE INVENTION

At present, water flooding is extensively used to produce crude oil in many oil fields worldwide, but because of the heterogeneity of the reservoir and disadvantageous oil-water mobility ratio there still is plenty of residual oil remaining in the subterranean formation after a water-drive. In order to produce such residual oil, besides dense drilling, a variety of new processes of enhanced oil recovery have been gradually converted from experimental research to the industrial practice in the field and have already been widely used in many oil regions in the world. In tertiary recovery techniques, chemical flooding is still one of the promising methods. Of chemical flooding processes, combined drive has been more widely adopted and its application has extended from sandstone reservoir to carbonate reservoir. Operation procedures and effectiveness for the chemical flooding processes are continually being improved. In addition, various combined chemical drive processes have been researched and developed, for example, combined two-components drive process such as an alkali-polymer drive, a surfactant-alkali drive, a surfactant-polymer drive, and combined three-components drive process such as alkali-surfactant-polymer, in order to improve the oil recovery efficiency of the chemical drive and reduce the production cost. Combined chemical agents can produce synergetic action, which not only reduces the used amount of the chemical agents but also results in higher oil recovery than that obtained by a single chemical drive or two-components combined drive. With regard to three-components drive process, not only has mechanism research in laboratory tests been extensively done, but also pilot tests of its application have been made in the recovery practices and a relatively significant effect has been attained. The mechanism of three-components drive process mainly is such: on the one hand, in three-components system the presence of the polymer may increase the viscosity of the displacing phase, thus reducing the oil-water mobility ratio and resulting in an increase in sweep area; on the other hand, the synergetic action of an alkali and a surfactant may bring about the super-low interfacial tension between the water and the oil, which makes crude oil more easily separate from the surface of reservoir rock thereby increasing the driving index, and at last enhancing the recovery by a big margin. In this regard, reference is made to SPE 24144, SPE 21028, SPE 17538.

To improve the ability of plugging high permeability zone or thief zone, through intensive studies, researchers found a foam which can more fully enter and decrease the permeability than a polymer or a gel, wherein the foam is typically divided into a normal foam and an enhanced foam. The normal foam is formed above or under ground generally by adding the surfactant to an injected gas. For example, U.S. Pat. No. 5,363,915 discloses a technique for enhancing oil recovery using the foam produced by a non-ionic surfactant, a non-condensible gas and water, wherein the foam is stable and can be formed under ground or can be formed above ground prior to injection in a well, and it is preferably employed within light oil-bearing carbonate formation. In addition, U.S. Pat. No. 5,074,358 described some other stable foam. In the enhanced foam, as the other foam, there is a chemical agent component that can enhance viscosity besides a surfactant. For example, U.S. Pat. No. 5,307,878 discloses a polymer enhanced foam used to increase foam stability and to reduce gas coning (fingering) problem, and the polymer enhanced foam comprises a polymer, an aqueous solvent and a gas. U.S. Pat. No. 5,129,457 discloses polymer-enhanced foam to treat a fractured subterranean formation thereby enhancing liquid hydrocarbon recovery. Said foam also comprises a polymer, a surfactant, an aqueous solvent and a gas, and the foam preferentially enters fractures present in the subterranean formation. However, the above mentioned processes for enhancing the recovery are directed to improve the sweep efficiency of the displacing agent, and the chemical agent component in the foam can not bring about super-low interfacial tension with the oil as they do in the three-components drive system. Therefore, final oil recovery generally falls within the range of 50 to 60 percent; while in the three-components drive process the profile control ability of a polymer is much less than that of the foam so that the increase of sweep efficiency is limited, and displacement fluid still easily breaks through and channels in high permeability zone. As a result, final oil recovery still is about 60% generally. Consequently, it is necessary to develop a driving process which can make full use of the synergetic advantages of the foam-drive and three-components drive process, as to further enhance the oil recovery in a subterranean oil-bearing formation and allow recovery of the residual oil in low permeability zone of relatively high oil saturation and the oil which is swept by a water flooding but fails to be recovered by the water flooding.

OBJECT OF THE INVENTION

It is the object of the present invention to make full use of the advantages of high flushing efficiency of three-components drive process and high sweep efficiency of foam-drive process and thereby to enhance the oil recovery by injecting a gas and three-components system simultaneously or alternately to form a foam above or under ground, thereby to avoid either the defect of the lower sweep efficiency in three-components drive process or lower flushing efficiency in the foam-drive process alone.

SUMMARY OF THE INVENTION

The present invention relates to a process for enhancing oil recovery from a subterranean oil-bearing formation, and more particularly, to a foam drive process, which comprises the following steps:

(1) injecting into the formation an aqueous polymer solution as a preceding-slug, in an amount of 2–8% pore volume of the formation;

(2) periodically injecting simultaneously or alternately a non-condensible gas and an aqueous solution of foaming composition to form a combined foam under ground or periodically injecting the combined foam formed beforehand by the gas and said aqueous solution above ground, said aqueous solution of foaming composition comprises an alkali, a surfactant and a polymer and its injection amount is 10–50% pore volume of the formation; said aqueous solution of the foaming composition is a super-low interfacial tension system, and the interfacial tension value between the foaming composition and the displaced subterranean oil may reach to $10^{-3}$ mN/m order of magnitude;

(3) injecting an aqueous polymer solution used as protecting-slug, in an amount of 10–45% pore volume of the formation.

DETAILED DESCRIPTION OF THE INVENTION

The present invention relates to a process for enhancing oil recovery from a subterranean oil-bearing formation, and more particularly, to a foam drive process, which comprises the following steps:

(1) injecting into the formation an aqueous polymer solution as a preceding-slug;

(2) periodically injecting simultaneously or alternately a non-condensible gas and an aqueous solution of foaming composition to form a combined foam under ground or periodically injecting the combined foam formed beforehand by the gas and said aqueous solution above ground, said aqueous solution of foaming composition comprises an alkali, a surfactant and a polymer;

(3) injecting an aqueous polymer solution used as protecting-slug.

In prior art, due to the presence of high permeability zone or thief zone in an oil-bearing formation, both the two-components drive and three-components drive lead to coning (fingering) to some extent. After extensive research, it is found that an aqueous polymer solution can be used as preceding-slug before the combined drive system is injected into an oil-bearing formation. Thus, on the one hand, the aqueous polymer solution preferentially enters the high permeability zone and/or the thief zone and reduces its permeability thereby preventing the gas in the foam injected subsequently from giving rise to gassing-out along the high permeability channel; on the other hand, molecules of the polymer are adsorbed and retained on the surface of the rock, which can reduce efficiently the loss of various active substances in the follow-up foam absorbing on the surface of the rock.

In accordance with the present invention, the polymer employed as preceding-slug may be a water-soluble biopolymer and/or a synthetic polymer with molecular weight of 300–30,000 Dalton. The biopolymer comprises xanthan gum and guar gum; the synthetic polymer comprises polyacrylamide and partially hydrolyzed polyacrylamide.

In accordance with the process of the present invention, after the aqueous polymer solution employed as a preceding-slug is injected into a subterranean oil-bearing formation, either a non-condensible gas and an aqueous solution of foaming composition comprising an alkali, a surfactant and a polymer will be periodically injected simultaneously or alternately as to form the combined foam under ground, or a combined foam formed beforehand by the gas and said aqueous solution above ground will be periodically injected. Because the aqueous polymer solution employed as a preceding-slug is injected first, the foam formed under ground by the non-condensible gas and the foaming solution injected simultaneously or alternately or the foam formed above ground by a non-condensible gas and the foaming solution will permeate more homogeneously in the subterranean formation and will not cause coning (fingering) problem. The non-condensible gas used in the process of the present invention is selected from the group consisting of nitrogen, natural gas, methane gas, air or mixtures thereof.

The aqueous solution of foaming composition used in the process of the present invention comprises an alkali, a surfactant and a polymer. The most remarkable characteristic of said aqueous solution of foaming composition is that it is able to form a super-low interfacial tension with the residual oil and with relatively high viscosity The polymer added to said aqueous solution may increase the viscosity of displacing phase, reduce the mobility ratio and enhance the conformance efficiency. The synergetic effect of alkali and surfactant may bring about super-low interfacial tension so that oil-water interfacial tension value may reach to $10^{-3}$ mN/m order of magnitude, and the whole system is a super-low interfacial tension system. Therefore, the flushing efficiency may be increased and thereby result in significant enhancement of oil recovery. According to the combined foam drive process of the present invention, total oil recovery may be increased by from 25 to 30 percent in general.

In accordance with the present invention, based on the total weight of the aqueous solution of composition, said aqueous solution of foaming solution may have 0.5–1.5% by weight of the alkali, 0.05–0.5% by weight of the surfactant and 0.05–0.5% by weight of the polymer. The alkali includes sodium hydroxide, potassium hydroxide, potassium carbonate, potassium bicarbonate, sodium carbonate and/or sodium bicarbonate, preferably the alkali is sodium hydroxide and sodium carbonate; the surfactant includes ionic surfactant or nonionic surfactant; said ionic surfactant includes alpha-olefinic sulfonate, $C_{12-16}$ alkyl sodium sulfonate, $C_{14-18}$ sodium alkyl benzene sulfonate; the non-ionic surfactant comprises triethanolamine, said polymer may be a water-soluble biopolymer and/or a synthetic polymer with molecular weight of 300–30,000 Dalton, the biopolymer includes xanthan gum and guar gum; the synthetic polymer includes polyacrylamide and partially hydrolyzed polyacrylamide.

In the foaming composition used in the process of present invention, said ionic or non-ionic surfactant produces synergetic effect with the alkali so that the foaming composition brings about $10^{-3}$ mN/m order of magnitude of super-low interfacial tension between itself and the oil and leads to excellent foamability.

The third step according to the process of the present invention is injecting a polymer used as a protecting-slug, and thereafter conducting water flooding. Injection of the protecting-slug aims at protecting efficiently the formed foam and at decreasing the diluting action of the follow-up water drive on the foam. It has been proved practically that according to the process of the present invention, injection of said polymer protecting-slug can further give full play to advantage of the foam.

In accordance with the process of the present invention, the polymer used as protecting-slug is a water-soluble biopolymer and/or a synthetic polymer with molecular weight of 300–30,000 Dalton, said biopolymer includes xanthan gum and guar gum; the synthetic polymer includes polyacrylamide and partially hydrolyzed polyacrylamide.

According to the process of the present invention, there is further provided the procedure of conducting a follow-up water-drive after injecting said aqueous polymer solution used as protecting-slug.

The mechanism of the combined foam drive process of the present invention is such: on the one hand, the formed foam preferentially enters and plugs high permeability pores which are present in the subterranean formation, which makes displacing fluid (including foam) to divert and enter low permeability zone thereby to increase sweep efficiency; on the other hand, the three-components system injected may produce super-low interfacial, tension with oil, so that the oil more easily separates from the surface of the rock, thus increasing the flushing efficiency, and stabilizing the foam to certain degree; at the same time, the floating action of the gas improves the oil movablity in the medium and low permeability zone of upper formation thereby enhancing the hydrocarbon recovery, i.e.oil recovery.

The polymer in the three-components system employed in the process of the present invention may stabilize the formed foam. In a Example of the present invention, three-components system was formulated from ORS-41 employed as a surfactant, sodium hydroxide employed as a alkali and various amounts of hydrolyzed polyacrylamide (HPAM) employed as a polymer and the half-life period ($t_{1/2}$) of the foam formed by the three-components system was tested. The results are shown in table 1.

TABLE 1 effect of the polymer on foam stability

| HPAM (mg/L) | 0 | 300 | 500 | 800 | 1000 | 1200 | 1500 |
|---|---|---|---|---|---|---|---|
| $t_{1/2}$ (min) | 5.2 | 8.5 | 10.6 | 11.5 | 14.0 | 16.4 | 18.5 |

As shown in table 1, addition of the polymer prolonged the half-life period of the foam formed by the composition. The more the amount of the polymer, the longer the half-life period of the foam, that is to say, the better the foam stability.

According to the process of the present invention, when the combined foam drive system of the present invention is used to produce oil, the used amount of various components is dependent on reservoir conditions in production regions such as heterogeneity, the losses of the chemical agents and economic cost, etc. Generally speaking, based on the pore volume (PV) in the subterranean formation, amount of the gas is not less than 50% pore volume, amount of the liquid is 10–50% pore volume, amounts of the polymer used as preceding-slug and protecting-slug are 2–8% pore volume and 10–45% pore volume respectively.

In accordance with the reservoir geological characteristic and well network situations, amounts of the polymer used as preceding-slug and protecting-slug may be decreased, even these two slugs or any of them may be cancelled.

The present invention can be employed to enhance efficiently the oil recovery from the subterranean oil-bearing formation, and thus on the basis of water-drive, generally the oil recovery can be increased by 25–30% OOIP (original oil in-place).

The present invention will be described below in further detail with reference to the following examples. But it should be understood that the present invention is not limited by these examples.

EXAMPLE

A coreflooding experiment was conducted using artificial two-dimensional core (I). Geometric size of the core is 4.5 cm×4.5 cm×30cm. The core was prepared from quartz sand cemented by epoxy resin and its average permeability was about 1 $\mu m^2$. The core consists of three layers and presents the positive rhythm distribution. The permeability variation coefficient was 0.72 and the original water salinity was 6778 mg/l. The used oil was degassed and dehydrated oil from the field; the salinity of the displacing water was 3700 mg/l.

EXAMPLE 1

A foaming composition with the following constituents

| component | amount (weight %) |
|---|---|
| alkyl aromatic sulfonate[1] | 0.3 |
| hydrolyzed polyacrylamide[2] | 0.12 |
| sodium hydroxide | 1.0 |
| water[3] | remainder |

[1]The trade name is ORS-41, available from ICT Incorporated in USA.
[2]The trade name is 1275A, molecular weight is 17,000,000, degree of hydrolysis is 25%, available from United Colloid Incorporated in England.
[3]The water salinity is 918.34 mg/l.

The displacement experiment was conducted using the artificial core as above described. After the core was saturated with water, oil was used to displace the water so that the core was initially saturated with oil. Then water was used to displace the oil until water content of drained liquid reaches to 98% at outlet of the core. Then in the case that the pressure at core outlet was 8.0 Mpa, said foam formed by the aqueous solution of foaming composition and methane gas was injected, wherein the injected volume of the aqueous solution of foaming composition is 0.3 PV, the injected gas is 0.36 PV; thereafter 0.283 PV of aqueous polymer (1275A) solution with a concentration of 600 mg/l was injected as protecting-slug; and finally water-drive was further conducted until the water content of drained liquid reaches to 98% at outlet of the core. The results are shown in table 2.

TABLE 2 experimental results of the foam-drive

| core permeability (kw $\mu m^2$) | porosity ($\Phi$) (%) | original oil saturation (%) | water drive recovery (%) | foam drive recovery (%) | total recovery (%) | gas-liquid ratio |
|---|---|---|---|---|---|---|
| 0.725 | 20.1 | 66.5 | 39.5 | 29.5 | 69.0 | 1.20 |

As shown by these results in Table 2, on the basis of water-drive, the foam combined drive process may be used to increase recovery by about 30% and total recovery is about 60%.

EXAMPLE 2

The same procedures as described in example 1 were performed, only with the two exceptions: the pressure at core outlet was normal pressure; and the gas and the combined system were injected by eleven slugs, and the gas-liquid ratio was kept at 1.0. The results are shown in table 3:

TABLE 3 the experimental results obtained by alternately injecting gas and liquid

| core permeability (kw μm²) | porosity (Φ) (%) | original oil saturation (%) | water drive recovery (%) | foam drive recovery (%) | total recovery (%) | gas-liquid ratio |
|---|---|---|---|---|---|---|
| 0.75 | 22.8 | 67.1 | 40.1 | 33.5 | 73.6 | 1.00 |

As shown by these results in table 3, on the basis of water-drive, injecting alternately gas and liquid further increase recovery by 33.5% and the total recovery attained to 73.6%, which demonstrates when injecting alternately the methane gas and the aqueous solution of foaming composition, the combined foam with excellent structures and properties could be formed in the core and the combined foam has the similar effect as the foam formed prior to injection into the cores.

Sand-packed model used in Examples below was two-dimensional longitudinally heterogeneous complex rhythm model (II). The geometric size of the model (II) was 4.5 cm×4.5 cm×30 cm. The model was prepared from quartz sand cemented by epoxy resin, and its average permeability was about 1 μm². The core consists of five layers, in which there was no impermeable barrier, the permeability variation coefficient was 0.61, the permeability of each layer from top to bottom respectively were 190×10⁻³ μm², 650×10⁻³ μm², 390×10⁻³ μm², 2700×10⁻³ μm², 1100×10⁻³ μm². The water used to saturate the model was artificially synthetic simulated brine with salinity of 6778 mg/l. The used oil was degassed and dehydrated oil from field; the water used to prepare the foaming composition and the displacing water both were artificially synthetic brine water with salinity of 918.34 mg/l. The experimental temperature was 45° C.

EXAMPLE 3

The displacement experiment was conducted in the artificial core model (II) as described above, using the same foaming composition as in Example 1. After the core was saturated with water, oil was used to displace the water so that the core was initially saturated with oil. Then water was used to displace the oil at the rate of 1 m/d until water content was 98% at outlet of the core. Thus the water-drive recovery was calculated. Thereafter, in the case that the pressure at core outlet was 8.0 Mpa, said foam formed by the aqueous solution of foaming composition and methane gas was injected at the rate of about 1 m/d, wherein the injected volume of the aqueous solution of foaming composition is 0.3 PV, the injected gas volume is 0.36 PV; thereafter, 0.283 PV of the aqueous polymer (1275A) solution with a concentration of 600 mg/l was injected as protecting-slug; and finally a water-drive was further conducted until the water content was 98% at outlet of the core. The results are shown in table 4.

TABLE 4 the experimental results of foam drive

| core permeability (kw μm²) | porosity (Φ) (%) | original oil saturation (%) | water drive recovery (%) | foam drive recovery (%) | total recovery (%) | gas-liquid ratio |
|---|---|---|---|---|---|---|
| 0.725 | 23.7 | 73.5 | 38.8 | 27.0 | 65.8 | 2.50 |

The results illustrate that the present invention is suitable specifically to the positive rhythm subterranean formation.

EXAMPLE 4

The displacement experiment was conducted in the artificial core model (II) as described above, using same foaming composition as in Example 1. After the core was saturated with water, oil was used to displace the water so that the core was initially saturated with the oil. Then a water-drive was used to displace oil at the rate of 1 m/d until water content was 98% at outlet of the core. The water-drive recovery was thus calculated. Thereafter, in the case that the pressure at core outlet was 8.0 Mpa, said foaming composition and said natural gas were injected alternately according to the following steps: (1) 0.1 PV of foaming composition and 0.05 PV of natural gas were injected; (2) 0.05 PV of foaming composition and 0.05 PV of natural gas were injected; (3) 0.05 PV of foaming composition and 0.05 PV of natural gas were injected; (4) 0.05 PV of foaming composition and 0.05 PV of natural gas were injected; (5)

0.05 PV of foaming composition and 0.1 PV of natural gas were injected. Thereafter 0.283 PV of the aqueous polymer (1275A) solution with a concentration of 600 mg/l was injected as protecting-slug; and finally a water-drive was conducted until the water content was 98% at outlet of the core. The results are shown in table 5.

TABLE 5 the results of foam-drive

| core permeability (kw $\mu m^2$) | porosity ($\Phi$) (%) | original oil saturation (%) | water drive recovery (%) | foam drive recovery (%) | total recovery (%) | gas-liquid ratio |
| --- | --- | --- | --- | --- | --- | --- |
| 0.725 | 21.6 | 67.7 | 49.5 | 24.4 | 73.9 | 1.00 |

As stated above, the process of the present invention can be used to increase oil recovery by 25–30% and is a highly efficient process for enhancing the oil recovery and suitable to heterogeneous reservoir conditions.

Above, the present invention was explained and illustrated by the Examples, but the present invention should not be limited by these Examples. It should be understood that, without deviating from the spirit of the present invention, the person generally skilled in the art may make various revisions and supplements to the present invention.

What is claimed:

1. A foam drive process, which comprises the following steps:
   (1) injecting into a subterranean oil-bearing formation, an aqueous polymer solution as a preceding-slug, in an amount of 2–8% pore volume of the formation;
   (2) periodically injecting simultaneously or alternately a non-condensible gas and an aqueous solution of foaming composition to form a combined foam under ground or periodically injecting the combined foam formed beforehand by the gas and said aqueous solution above ground, said aqueous solution of foaming composition comprises an alkali, a surfactant and a polymer, and injection amount of the aqueous solution is 10–50% pore volume of the formation, said aqueous solution of the foaming composition is a super-low interfacial tension system, and the interfacial tension value between the foaming composition and displaced subterranean oil may reach to $10^{-3}$ mN/m order of magnitude; and
   (3) injecting an aqueous polymer solution used as protecting-slug, in an amount of 10–45% pore volume of the formation.

2. The process according to claim 1, further comprising a step of conducting a follow-up water drive.

3. The process according to claim 1 wherein a polymer of the polymer solution used as the preceding-slug comprises a water-soluble biopolymer and/or a synthetic polymer with molecular weight of 300–30,000 Dalton.

4. The process according to claim 3 wherein the biopolymer is selected from the group consisting of xanthan gum and guar gum.

5. The process according to claim 3 wherein the synthetic polymer is selected from the group consisting of polyacrylamide and partially hydrolyzed polyacrylamide.

6. The process according to claim 1 wherein the noncondensible gas is selected from the group consisting of nitrogen, natural gas, methane gas, air or mixtures thereof.

7. The process according to claim 1 wherein the aqueous solution of foaming composition comprise 0.5–1.5% by weight of the alkali, 0.05–0.5% by weight of the surfactant and 0.05–0.5% by weight of the polymer, based on the total weight of the composition.

8. The process according to claim 7 wherein the alkali is selected from the group consisting of sodium hydroxide, potassium hydroxide, potassium carbonate, potassium bicarbonate, sodium carbonate and/or sodium bicarbonate.

9. The process according to claim 7 wherein the surfactant is selected from the group consisting of ionic surfactant or non-ionic surfactant.

10. The process according to claim 7 wherein the polymer is selected from a water-soluble biopolymer and/or a synthetic polymer with molecular weight of 300–30,000 Dalton.

11. The process according to claim 10 wherein the biopolymer is selected from the group consisting of xanthan gum and guar gum.

12. The process according to claim 10 wherein the synthetic polymer is selected from the group consisting of polyacrylamide and partially hydrolyzed polyacrylamide.

13. The process according to claim 1 wherein a polymer of the polymer solution employed as the protecting-slug is selected from a water-soluble biopolymer and/or a synthetic polymer with molecular weight of 300–30,000 Dalton.

14. The process according to claim 13 wherein the biopolymer is selected from the group consisting of xanthan gum and guar gum.

15. The process according to claim 13 wherein the synthetic polymer is selected from the group consisting of polyacrylamide and partially hydrolyzed polyacrylamide.

16. The process according to claim 1 wherein volume of the injected gas is at least 50% pore volume of the formation.

* * * * *